US010538009B2

(12) United States Patent
Schmeiser et al.

(10) Patent No.: US 10,538,009 B2
(45) Date of Patent: Jan. 21, 2020

(54) DEVICE FOR SLICING FOOD PRODUCTS

(71) Applicant: TEXTOR MASCHINENBAU GMBH, Wolfertschwenden (DE)

(72) Inventors: Jorg Schmeiser, Wiggensbach (DE); Josef Mayer, Memmingerberg (DE)

(73) Assignee: Textor Maschinenbau GmbH (DE)

( * ) Notice: Subject to any disclaimer, the term of this patent is extended or adjusted under 35 U.S.C. 154(b) by 451 days.

(21) Appl. No.: 14/654,982

(22) PCT Filed: Dec. 19, 2013

(86) PCT No.: PCT/EP2013/077432
§ 371 (c)(1),
(2) Date: Jun. 23, 2015

(87) PCT Pub. No.: WO2014/102142
PCT Pub. Date: Jul. 3, 2014

(65) Prior Publication Data

US 2015/0367523 A1 Dec. 24, 2015

(30) Foreign Application Priority Data

Dec. 24, 2012 (DE) ........................ 10 2012 224 360
Jan. 14, 2013 (DE) ........................ 10 2013 200 403

(51) Int. Cl.
*B62D 1/16* (2006.01)
*B26D 1/16* (2006.01)
*B26D 1/157* (2006.01)

(52) U.S. Cl.
CPC ............... *B26D 1/16* (2013.01); *B26D 1/157* (2013.01); *B26D 2210/02* (2013.01); *B26D 2210/08* (2013.01); *Y10T 83/7788* (2015.04)

(58) Field of Classification Search
CPC ...... B26D 1/16; B26D 1/157; B26D 2210/02; B26D 2210/08; Y10T 83/7788
See application file for complete search history.

(56) References Cited

U.S. PATENT DOCUMENTS

2001/0054345 A1* 12/2001 Krauss ..................... B26D 1/16
83/703
2007/0028742 A1* 2/2007 Mueller ................ B26D 1/157
83/676

(Continued)

FOREIGN PATENT DOCUMENTS

DE 10030691 A1 1/2002
DE 102009048056 A1 4/2011

(Continued)

OTHER PUBLICATIONS

International Preliminary Report on Patentability for related International Application No. PCT/EP2013/077432 dated Jun. 30, 2015; 7 pages.

*Primary Examiner* — Kenneth E Peterson
*Assistant Examiner* — Liang Dong

(57) ABSTRACT

The invention relates to a device for slicing food products, in particular a high-performance slicer, comprising a rotor shaft which rotates about a rotational axis during operation and which can be adjusted in an axial manner, in particular in order to carry out blank cuts and/or to adjust cutting gaps; a rotor which is driven by the rotor shaft; a cutting blade which is supported by the rotor, in particular a circular blade which rotates about the rotational axis in a planetary manner and additionally rotates relative to the rotor about a blade axis that runs parallel to the rotational axis in an offset manner; and a rotary drive for the rotor shaft.

14 Claims, 9 Drawing Sheets

(56) References Cited

U.S. PATENT DOCUMENTS

Figure 1:
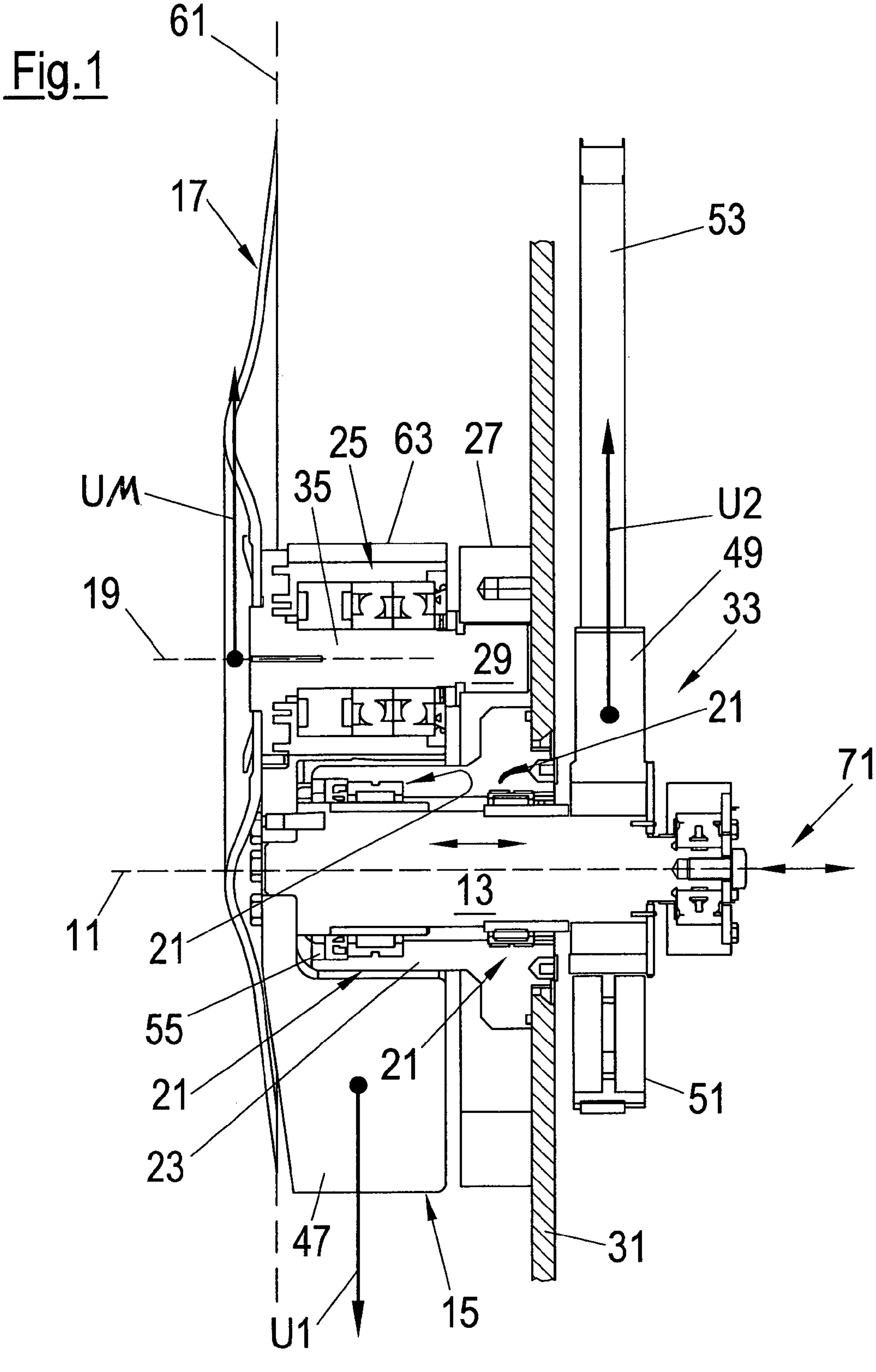

| | | | | |
|---|---|---|---|---|
| 2007/0199421 | A1 | 8/2007 | Mueller | |
| 2010/0192745 | A1* | 8/2010 | Weber .................. | B26D 7/2635 83/508.2 |
| 2011/0126680 | A1* | 6/2011 | Weber .................. | B26D 7/2635 83/13 |
| 2011/0179922 | A1* | 7/2011 | Weber .................. | B26D 7/2635 83/13 |
| 2011/0247466 | A1 | 10/2011 | Weber | |
| 2011/0247470 | A1* | 10/2011 | Weber .................. | B26D 7/2635 83/401 |

FOREIGN PATENT DOCUMENTS

| | | | |
|---|---|---|---|
| DE | 102010008047 | A1 | 8/2011 |
| DE | 102012207304 | A1 | 11/2013 |
| EP | 2374583 | A1 | 3/2011 |
| EP | 2357064 | A2 | 8/2011 |
| WO | 2005009695 | A1 | 2/2005 |
| WO | 2008034513 | A1 | 3/2008 |

* cited by examiner

DEVICE FOR SLICING FOOD PRODUCTS

CROSS-REFERENCES TO RELATED APPLICATIONS

This application is a National Phase Application of Patent Application PCT/EP2013/077432, filed on Dec. 19, 2013, which claims priority to German patent application no. 102012224360.7, filed on Dec. 24, 2012, and German patent application no. 102013200403.6, filed on Jan. 14, 2013, each of which are incorporated herein by reference, in their entirety.

The invention relates to an apparatus for slicing food products, in particular to a high-performance slicer. The invention furthermore relates to a system having such a slicing apparatus and having at least two differently configured cutting blade carriers which are each releasably attachable to a rotor shaft.

Such slicing apparatus are generally known and serve to cut food products such as sausage, meat and cheese into slices at high speed. Typical cutting speeds lie between several 100 to some 1000 cuts per minute.

Modern high-performance slicers differ inter alia in the design of the cutting blade and in the manner of the rotary drive for the cutting blade. So-called scythe-like blades or spiral blades only rotate about a blade axis, with this blade axis itself not carrying out any additional movement. Provision is in contrast made with slicers having circular blades or orbital blades to allow a circular blade rotating about a blade axis to revolve in a planetary motion about a further axis—here also called an axis of rotation—spaced apart from the blade axis in addition to this rotation. Which blade type or which type of drive is to be preferred depends on the respective application. It can generally be stated that higher cutting speeds can be achieved with only rotating scythe-like blades, whereas circular blades which rotate and additionally revolve in a planetary motion can be used more universally without compromises in the cutting quality.

The invention relates to slicing apparatus having a circular blade revolving in a planetary motion. Typical cutting speeds here lie in the range from approximately 350 to 800 revolutions per minute, i.e. approximately 350 to 800 slices per minute can be cut off from a product using such a slicer.

It becomes necessary approximately from such cutting speeds onward that so-called blank cuts are carried out with a portion-wise slicing of products in which blank cuts the blade continues to move, i.e. to carry out its cutting movement, but does not cut into the product in so doing, but cuts into "space" so that temporarily no slices are cut off from the product and these "cutting breaks" can be used to transport away a portion formed with the previously cut off slices, for example a slice stack or slices arranged overlapping. The time which elapses between two slices cut off after one another is no longer sufficient from a specific cutting performance or cutting speed onward for a proper transporting away of the slice portions. The length of these "cutting breaks" and the number of blank cuts per "cutting break" depend on the respective application.

As already mentioned, such a blank cut operation becomes necessary in practice from a specific limit cutting speed or limit rotational speed of the blade onward which typically amounts to between approximately 350 and 600 revolutions per minute. This is the reason why modern scythe-like blade slicers, with which much higher cutting speeds can be achieved, are generally provided with an axial drive with which the blade can be moved away from the product sufficiently fast to carry out blank cuts. In this connection, one also speaks of a "cycling away" of the blade or of the blade mount supporting the blade and such slicers are also called "cyclable" slicers.

Such cyclable circular blade slicers have already been proposed even though modern circular blade slicers—as mentioned—usually work in a rotational speed range in which a cycling away of the blade for the carrying out of blank cuts is not absolutely necessary at least for most applications. A possibility of implementing such a cyclable circular blade slicer is described in WO 2008/034513 AI. The cutting head including the circular blade has a relatively complex design and is axially adjustable as a whole. The cutting head has a rotationally fixed axle, wherein a hub which is rotationally driven by a rotary drive and which represents the blade mount at the same time can be rotated about this rotationally fixed axle.

This known circular blade slicer reveals a general basic problem which in principle stands in the way of a cyclable design of a circular blade slicer, namely the requirement of not only allowing the circular blade to revolve in a planetary motion, but also of providing it with a rotation. The circular blade consequently not only has to be driven in a revolving planetary motion, but also has to be set into rotation about its own blade axis. A drive technology results from this which is anyway already complex and which requires a disproportionately higher construction effort when the circular blade should additionally be axially adjusted in a fast and precise manner to be able to carry out blank cuts.

The demands on an axial adjustability with circular blade slicers are furthermore increased even further in that circular blades—unlike scythe-like blades—are based on a different cutting principle: Whereas with scythe-like blades the relative movement between the blade edge and the product required for the cutting is generated by the scythe-like shape or spiral shape of the blade only rotating about the blade axis, it is the revolving movement in a planetary motion which generates the required cutting movement with circular blades. This has the consequence that more time in which the blade is located outside the product region and can thus be axially adjusted is available per revolution with circular blades in comparison with scythe-like blades. The corresponding rotational angle range, which is also called a clearance angle, is frequently more than 180° with circular blades, whereas only a clearance angle of typically just 100° is available with scythe-like blades which are also operated at a higher rotational speed.

As regards an axial adjustment, circular blade slicers are consequently in principle much less critical with respect to time overall. There have nevertheless hardly been any attempts to date to develop concepts for cyclable circular blade slicers which are suitable for practice.

Reference must in addition be made to DE 100 30 691 AI and WO 2005/009695 AI which show concepts for circular blade slicers in which an axial adjustment of the circular blade is not provided and which thus do not belong to the category of the slicing apparatus described by the present disclosure.

It is the object of the invention to provide a slicing apparatus which is based on the principle of a circular blade which revolves in a planetary motion and which is capable of a blank cut operation, wherein a simple, compact and hygienic design and in particular the full functionality of modern high-performance slicers should also be present.

This object is satisfied by the features of claim 1.

In accordance with the invention, the slicing apparatus comprises a rotor shaft which rotates about an axis of rotation and is axially adjustable in operation; a rotor driven by the rotor shaft; a cutting blade which is supported by the rotor, which revolves about the axis of rotation in a planetary motion and which additionally rotates relative to the rotor about a blade axis extending offset in parallel with the axis of rotation; and a rotary drive for the rotor shaft.

Moving away from the previously explained concept in accordance with WO 2008/034513 AI, the invention is based on the idea of not adjusting the entire cutting head in an axial direction, but of rather axially adjusting a rotor shaft supporting the cutting blade via a rotor, i.e. of rather providing an axially adjustable rotor shaft.

This concept makes possible in a surprising manner—above all in specific concrete embodiments such as will be explained in more detail in the following—a simple, almost minimalistic design of a cyclable circular blade slicer which is also compact, meets the highest demands on hygiene and furthermore—despite an omission of components present at other high-performance slicers of a comparable performance capability—nevertheless satisfies a very high degree of functionality. The concept in accordance with the invention also and actually allows an ideal axial adjustment of the blade to be concentrated on, whereby important functions such as the cutting gap setting can also be taken over so that e.g. an axially adjustable cutting edge is not required. A retraction of the product is also not required since the blade can be axially adjusted for blank cut operation. Finally, complex and/or expensive tractors or conveyor belts for the product can also be omitted for this reason.

In other words, it is a special feature of the invention that a circular blade slicer, which actually does not require any axial blade adjustment due to the cutting speed, is nevertheless optimized with respect to an axial blade adjustment since it has been recognized that, with a skillful basic design, a circular blade slicer can also be provided with an axial adjustment for the blade which functions in a fast and reliable manner and which is additionally also able to take over essential functions, whereby otherwise necessary components can in turn be omitted, which—and thus the circle is closed—at least facilitates the optimization of the axial adjustment.

Possible embodiments of the slicing apparatus in accordance with the invention are set forth in the dependent claims, in the description and in the drawing.

In an embodiment, a combined axial and rotary bearing is provided for the rotor shaft, relative to which bearing the rotor shaft is rotatable and can be axially adjusted. The axial and rotary bearing can in this respect in particular comprise a fixed-position hub or be associated with a fixed-position hub. The hub can consequently form a component of the axial and rotary bearing or can be considered as a component cooperating with the axial and rotary bearing. Such a combined bearing for the rotational movement of the rotor shaft, on the one hand, and for the axial movement of the rotor shaft, on the other hand, allows a simple and compact design.

When a fixed-position hub is provided for the axial and rotary bearing, this hub can be used for a plurality of functions. The rotor shaft can be supported by means of the hub at a fixed-position rack part or frame part, for example at a housing wall, of the apparatus. Alternatively or additionally, the hub can serve as a support for further components, for example for components which cooperate with a rotational drive for the rotation of the cutting blade or which form a stationary part of such a rotational drive.

It is possible to achieve a particularly compact arrangement which is in particular comparatively short in the axial direction if, in accordance with a further embodiment, a front region of a hub for the rotor shaft and at least one region of the rotor comprising a rotary bearing for the cutting blade axially engage into one another and if in addition a stationary part of a rotational drive for the cutting blade arranged at the rear region of the hub and a rotor-side part of the rotational drive axially engage into one another.

The circumstance is exploited in this respect that the rotor shaft providing the axis of rotation for the rotor and the rotational drive defining the blade axis for the rotation of the blade are radially spaced apart. This arrangement consequently allows the respective axial engaging into one another of the components and overall provides a so-to-say "nested" design or a high packing density of the respective components. The available construction space, in particular in the axial direction, is hereby ideally used. The relatively short construction length of such a construction additionally reduces the required support forces which in particular have to be taken up by the hub.

As already mentioned, a hub which is provided for the rotor shaft and which provides the axial and rotational support of the rotor shaft can be supported by a fixed-position rack part or frame part of the apparatus.

A preferred arrangement is in particular especially advantageous under hygienic aspects according to which a hub for the rotor shaft is outwardly open and a combined axial and rotary bearing for the rotor shaft is sealed with respect to the environment between the hub and the rotor shaft.

The rotor shaft is in particular led through a fixed-position rack part or frame part at whose one side the rotary drive is arranged and at whose other side the rotor is arranged. The drive region of the rotor shaft is hereby separated from the cutting region by means of the rack part or frame part, which is in particular formed as a housing or as a housing wall, which is in particular advantageous under hygienic aspects.

In a particularly advantageous embodiment of the invention, a rotational drive providing the rotation of the cutting blade is decoupled from the rotor shaft. It is hereby not necessary to effect the rotational drive for the blade directly by the rotor shaft. It is therefore possible to avoid belt arrangements or toothed wheel arrangements which are complex and/or expensive in construction and which should otherwise be provided to provide the rotational drive for the rotation of the blade directly by the rotor shaft.

It is particularly preferred if the rotational drive for the cutting blade is derived from the rotational movement of the rotor.

The revolving movement of the rotor which anyway takes place can thus be used additionally to set the blade, which revolves in a planetary motion due to the rotational movement of the rotor, into rotation relative to the rotor. In other words, the relative movement of the blade, in particular the relative movement of a blade shaft releasably connected to the blade, which is present due to the revolution in a planetary motion of the circular blade, can be exploited to give the blade or the blade shaft a rotation.

In an embodiment, the rotational drive for the cutting blade can comprise a stationary part and a part at the rotor side, wherein the stationary part and the part at the rotor side cooperate when the rotor is attached to the rotor shaft. The relative movement of the rotor-side part of the rotational drive with respect to the stationary drive present due to the revolution in a planetary motion can hereby be converted into a rotational movement of the part at the rotor side and thus of the blade or of the blade shaft.

The cooperation between the stationary part and the part at the rotor side is in particular designed such that relative movements are permitted in the axial direction between the two parts. It is hereby possible, in particular for the carrying out of blank cuts and/or for the setting of a cutting gap and/or for the assembly or dismantling of the rotor, to axially adjust the rotor shaft together with the blade and the rotor-side part of the rotational drive without the rotational drive standing in the way of this.

Provision is in particular made in this respect that the rotor shaft is axially adjustable relative to the stationary part of the rotational drive for the cutting blade.

The stationary part of the rotational drive for the cutting blade can be supported by a combined axial and rotary bearing and/or by a hub for the rotor shaft. The hub can contribute to the rotation of the cutting blade in this manner.

A rotor-side part of the rotational drive which carries out the rotational movement together with the rotor can be formed by a blade shaft of the cutting blade so that it is the blade shaft which cooperates with the stationary part of the rotational drive.

The stationary part of the rotational drive can comprise a ring at which the blade shaft rolls off. Provision is in particular made in this respect that the ring is formed as a sprocket which cooperates with a toothed wheel of the blade shaft.

This concept for implementing the rotational drive for the rotation of the blade is simple and reliable from a construction aspect, wherein the available construction space is additionally ideally exploited without a complicated mechanism being necessary for transferring the rotary movement of the rotor shaft outwardly in a radial direction to the blade shaft. Complex belt arrangements or toothed wheel arrangements are hereby avoided.

In an alternative design of the rotational drive for the rotation of the rotational blade, in accordance with a further embodiment of the invention, a drive shaft or drive axle arranged coaxially with respect to the rotor shaft is provided by which a blade shaft of the cutting blade can be driven, for example via a belt arrangement and/or a toothed wheel arrangement. In this respect it is possible, but not absolutely necessary, to provide a separate rotational drive for the drive shaft. The axle can be a fixed-position, i.e. a non-rotating, drive axle, relative to which the rotor rotates, wherein this relative movement is converted into the rotation of the blade or of the blade shaft.

The drive shaft or the drive axle can be telescopic in order in this manner in particular to allow an axial adjustment for the carrying out of blank cuts and/or for the setting of a cutting gap. Alternatively, the drive shaft or the drive axle can be axially adjustable as a whole.

In a particularly advantageous embodiment, the rotor shaft is formed as a hollow shaft through which the drive shaft or the drive axle extends.

The cooperation between the drive shaft or the drive axle for the rotation of the cutting blade with the blade shaft can take place within the rotor in a further embodiment, with the drive shaft or the drive axle extending into the rotor.

Provision is in particular preferably made for the carrying out of blank cuts and/or for the setting of a cutting gap that both the rotor shaft and the drive shaft or the drive axle are at least partly axially adjustable. The rotor shaft and the drive shaft or the drive axle are in particular axially adjustable simultaneously or together.

In a slicing apparatus having a cutting blade revolving in a planetary motion, the cutting blade is radially outwardly displaced with respect to the rotor shaft setting the rotor into rotation and thus with respect to the axis of rotation of the rotor, i.e. the cutting blade is eccentrically arranged. The rotor hereby has an imbalance caused by the cutting blade. The slicing apparatus has to be balanced in all planes to ensure a vibration-free running of the rotor or of the blade in particular at the high rotational speeds in cutting operation.

The slicing apparatus in accordance with the invention, in particular in an aspect as was explained above with reference to possible embodiments, allows a particularly simple and effective balancing concept which satisfies the demands mentioned. In contrast to known balancing concepts, the invention in particular manages without any complex constructions and without any expensive materials such as tungsten for the balance masses.

The term "imbalance" is to be understood in the following, also generally in dependence on the context, with respect to magnitude and direction, as an imbalance mass, an imbalance location and/or a force effective on the rotation due to the imbalance mass.

Axial spacings, that is spacings measured along the axis of rotation or along the blade axis, relative to a cutting blade here relate, if not otherwise stated, to a cutting plane defined by the blade or by the blade edge, whereas the axial location of a balance mass or of an imbalance relates to a plane which extends perpendicular to the axis of rotation or to the blade axis and in which the center of mass of the balance mass or of the imbalance lies. Indications on the location or direction of effect of a balance mass here generally, if not otherwise stated, also relate to the imbalance generated by the balance mass or by the component or assembly into which the respective balance mass is integrated.

If an integration of a balance mass into a component or into an assembly of the apparatus is understood in the sense of a direct addition of an additional mass, it is clear to the skilled person that this is equivalent to a direct removal of material from a component or assembly, in mathematical terms that is equivalent to a direct addition of a "negative balance mass", that is generally equivalent to the direct generation of an imbalance at or in the respective component or assembly.

In accordance with an embodiment of the invention, at least two balance masses are provided for compensating an imbalance of the rotor caused by the cutting blade, with all the balance masses being arranged at the side of the cutting blade disposed opposite the dismantling side of the cutting blade and preferably being axially spaced apart from one another.

This means a moving away from such known balancing concepts in which the counterweight is distributed over both blade sides to compensate the imbalance, that is at least one balance mass is arranged in front of the blade and at least one further balance mass is arranged behind the blade. This concept also makes it possible to manage without any complex constructions and without any expensive materials for the balance masses.

In an advantageous embodiment of the invention, the rotor forms a balance mass and has an asymmetrical rotational geometry with respect to the axis of rotation.

In this respect it is the rotor itself which forms a balance mass serving for the balancing of the blade, i.e. the rotor itself at least partly compensates its imbalance caused by the eccentrically arranged blade. It is hereby made possible to position the required balance mass axially close to the blade, on the one hand, and radially relatively far to the outside, on the other hand. A particularly efficient balancing concept can hereby be realized overall. A sufficiently large imbalance can be generated by the asymmetrical design of the rotor with a relatively small total weight of the rotor.

The rotor can, in favor of a balance mass disposed as far radially outwardly as possible, in particular deviate by an extreme amount from a circular outer contour and can so-to-say be designed very top-heavy—with respect to the radial direction—i.e. it can be subject to a relatively large imbalance or imbalance mass, for example—figuratively speaking—like a rotating hammer.

Since the rotor itself forms a balance mass, the design is particularly simple. The balance mass is in this manner additionally located axially particularly close to the cutting plane. A further, separate balance mass in the axial vicinity of the cutting blade is thus not necessary.

On a replacement of a blade with a blade of a different weight, by which a different imbalance is consequently caused, only the rotor has to be replaced. The slicing apparatus can thus be adapted particularly simply to different applications. Blades of different weights can thereby be used in a simple manner.

Since only the rotor has to be replaced, the further components of the slicing apparatus can be retained. An additionally provided further balance mass can in particular remain in the same position.

In accordance with an embodiment of the invention, a further balance mass can be formed by the rotary drive, in particular by a drive pulley or by a hub which can be set into rotation by means of a drive motor via a drive belt. The rotary drive hereby satisfies a further function in that not only the rotor shaft is set into rotation, but also a portion of the imbalance of the rotor is compensated.

The rotary drive together with the rotor and the circular blade consequently forms a mass system due to the balance mass or the imbalance and said mass system can be designed with respect to dimensions and arrangement such that the total center of mass of the rotating system is located at that side of the cutting blade at which the rotary drive is also disposed. In other words, this center of mass is "pulled" to the side of the rotary drive by the imbalance in the rotary drive. It is consequently likewise possible to arrange the further balance mass at this side of the cutting blade so that all the balance masses are only located at one side of the cutting blade.

The balance mass of the rotary drive can be arranged at a relatively large axial distance from the cutting plane with respect to the axial length of the total arrangement—measured between the cutting plane and the plane of the rotary drive. A relatively large lever effect of this balance mass so-to-say results from this, with the balance mass itself thus only having to have a comparatively small weight, which in turn facilitates its integration into the rotary drive in practice or makes it possible at all.

In combination with the balance mass formed by the rotor and thus located axially extremely close to the cutting plane, the balance mass formed by the rotary drive can consequently effect an ideal balancing of the rotating total system, both statically and dynamically, in all planes and it can do this with an extremely compact design of the total arrangement.

It is a further advantage that a blade having a different weight and thus a blade causing a different imbalance can be balanced by modifying the rotary drive, for example, by a replacement of the drive pulley or of the hub. The rotor itself, which serves as a balance mass in addition to the rotary drive, does not necessarily have to be replaced in this respect, with it, however, being possible on a blade replacement to replace both the rotor and the drive pulley or the hub, the latter in particular when it is not possible or not desired to compensate the change of the imbalance to be compensated associated with a blade change solely by replacing the rotor.

When the first balance mass is formed by the rotor and the second balance mass is integrated into the rotary drive, provision is in particular made that the two balance masses are arranged at different sides of a fixed-position rack part or frame part.

The arrangement of the two balance masses in particular takes place such that the first balance mass and the imbalance of the rotor act at least approximately in opposite radial directions, whereas the second balance mass acts at least approximately in the same radial direction as the imbalance of the rotor. Provision is in particular made in this respect that the first balance mass is arranged closer to the cutting blade in the axial direction than the second balance mass.

Provision can in particular be made in the "nested" arrangement of the components, as was explained above, that the first balance mass is at least approximately arranged in the axial direction at the level of a combined axial and rotary bearing for the rotor shaft and/or at the level of a rotary bearing for the cutting blade integrated into the rotor.

A system balanced, both statically and dynamically, in all planes can consequently also be implemented with a slicer of comparatively compact and relatively simple design due to the geometrical arrangement of the balance masses possible in accordance with the invention.

The object underlying the invention is additionally satisfied by the initially mentioned system which comprises a slicing apparatus and at least two differently configured cutting blade carriers which are each releasably attachable to a rotor shaft of the slicing apparatus.

The one carrier is in this respect formed as a blade mount for a cutting blade, in particular for a scythe-like blade or spiral blade, the blade mount rotating about the axis of rotation in operation, and the cutting blade only carrying out a rotation about the axis of rotation, whereas the other carrier is formed as a rotor for a cutting blade, in particular a circular blade, the rotor rotating about the axis of rotation in operation and the cutting blade revolving about the axis of rotation in a planetary motion and additionally rotating relative to the rotor about a blade axis extending offset in parallel with the axis of rotation.

A universally usable slicing apparatus is provided by this concept which can selectively be used as a scythe-like blade or as a circular blade. One and the same basic design, which in particular comprises the axially adjustable rotor shaft together with the rotary drive for the rotor shaft and the fixed-position hub together with the axial and rotary bearing, is consequently used either with a blade mount for a scythe-like blade or with a rotor for a circular blade. The rotor shaft, on the one hand, and the blade mount or the rotor, on the other hand, in this respect each comprise interfaces coordinated with one another which allows a change from a scythe-like blade operation into a circular blade operation, and vice versa, in a very simple manner.

This universal principle can be realized in a particularly simple manner if a rotational drive provided for the rotation of the circular blade is designed in accordance with the principle which is explained above with reference to an embodiment and according to which the slicing apparatus comprises a stationary part of the rotational drive which cooperates with a rotor-side part of the rotational drive with an attached rotor, that is in circular blade operation, and which remains inactive at the apparatus with an attached blade mount, that is in scythe-like blade operation.

In other words, in a preferred embodiment, that cooperation between the stationary part and the rotor-side part of the rotational drive which in particular permits an axial adjustment movement for the carrying out of blank cuts and/or for the setting of a cutting gap in circular blade operation can also allow a simple dismantling of the circular blade rotor to connect a blade mount of a scythe-like blade to the rotor shaft belonging to the basic design of the slicing apparatus after the dismantling of the circular blade rotor. In this scythe-like blade operation, the stationary part of the rotational drive then consequently remains unused, but also does not stand in the way of scythe-like blade operation.

The balancing concept explained above likewise does not stand in the way of this universal principle. The two concepts can rather advantageously be combined with one another when the first respective balance mass is integrated into the respective carrier or is formed by the carrier, i.e. when both the blade mount for the scythe-like blade and the rotor for the circular blade include a first balance mass coordinated with the respective blade and with the second balance mass integrated into the basic design of the slicing apparatus.

Figure 8:
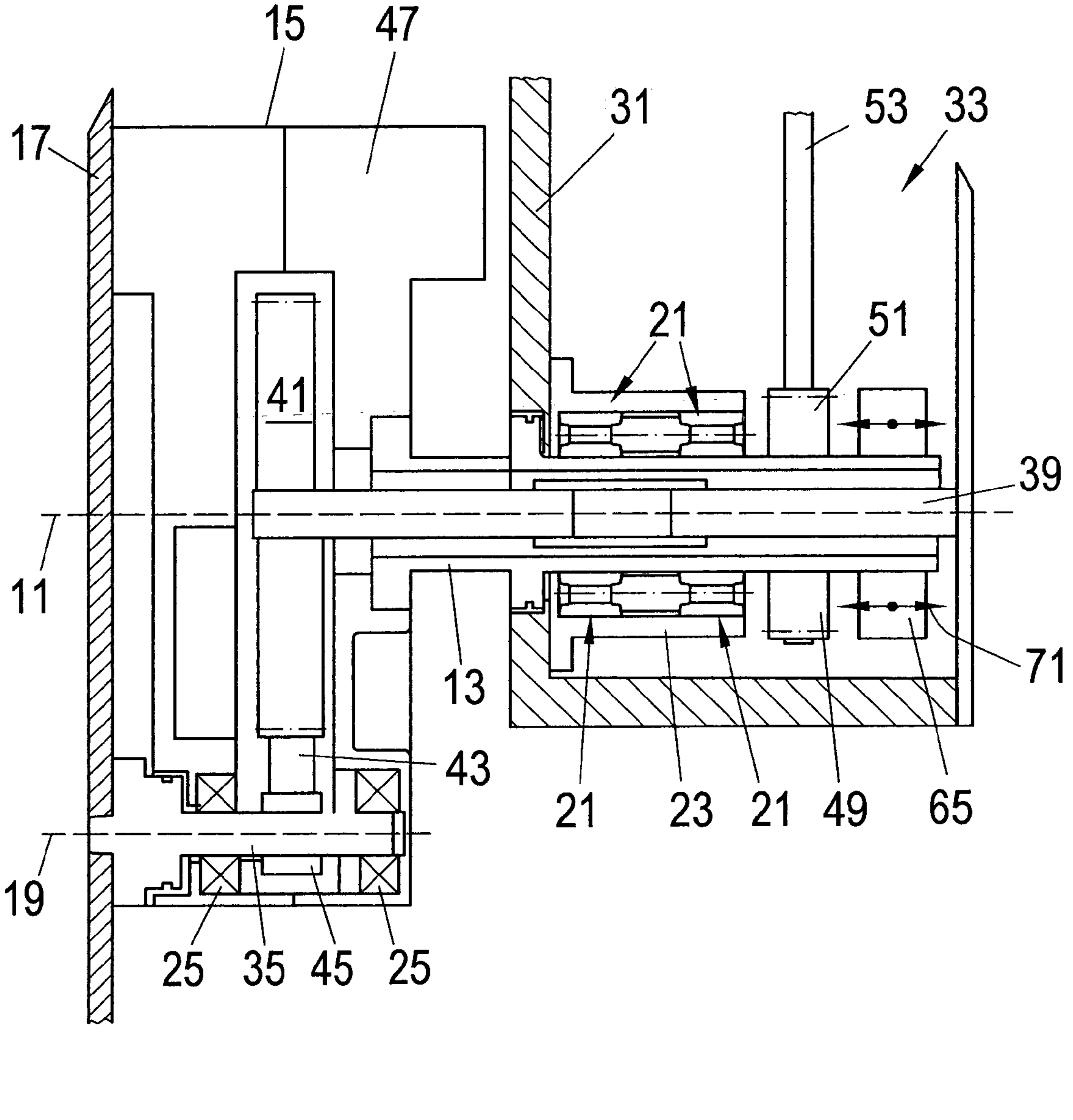
Figure 9:
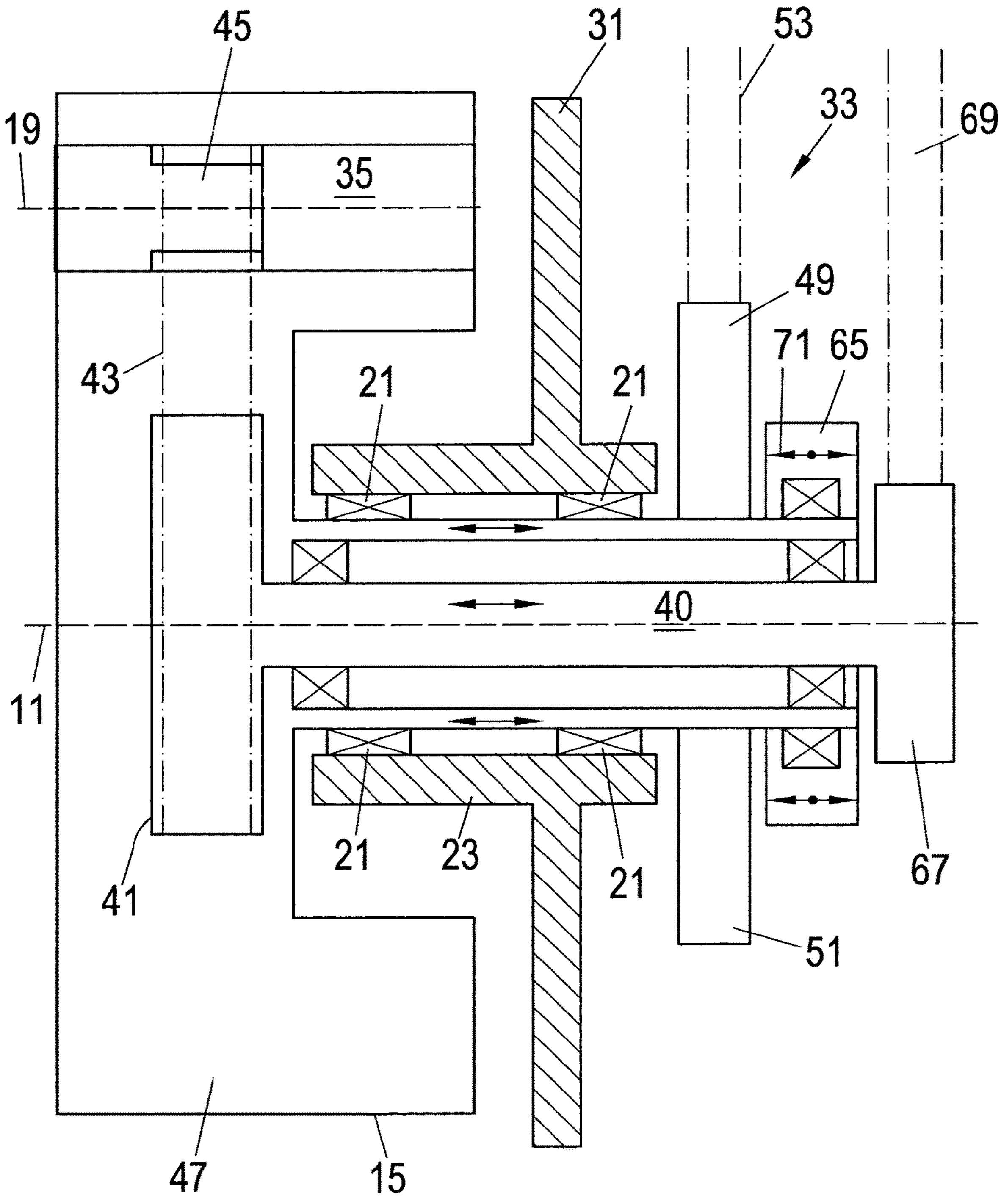

The invention will be described in the following by way of example with reference to the drawing. There are shown:

FIGS. 1 to 7 different views of a part of a slicing apparatus in accordance with the invention in accordance with an embodiment;

FIG. 8 a sectional side view of a part of a slicing apparatus in accordance with the invention in accordance with a further embodiment; and FIG. 9 a sectional side view of a part of a slicing apparatus in accordance with the invention in accordance with a further embodiment.

FIG. 1 shows, in a sectional side view, a part of a slicing apparatus (slicer) also called a blade head or a cutting head for slicing food products, in particular sausage, ham or cheese.

A hub 23 is fastened to a housing or to a fixed-position housing wall 31. A combined axial and rotary bearing 21 for a rotor shaft 13 is arranged in the interior of the hub 23 and the rotor shaft defines an axis of rotation 11 of the slicer. The rotor shaft 13 is thus supported within the hub 23 rotatable about the axis of rotation 11 and axially adjustable in the direction of the axis of rotation 11. An axial drive 71, not shown in any more detail, which engages at the rear end of the rotor shaft 13 is provided for the axial adjustment of the rotor shaft 13, which is indicated by double arrows.

A rotary drive 33 for the rotor shaft 13 is located in a region disposed behind the housing wall 31. The rotary drive 33 comprises a drive pulley 51 which is provided with an outer toothed arrangement, which is attached in the rear region of the rotor shaft 13 and which cooperates with a toothed drive belt 53 which is driven by a drive motor (not shown) to set the rotor shaft 13 into rotation about the axis of rotation 11.

A rotor 15 is fastened to the front end of the rotor shaft 13 disposed outside the housing wall 31. The rotor 15 radially spaced apart from the axis of rotation 11 includes a rotary bearing 25 for a blade shaft 35 which defines a blade axis 19 extending in parallel with the axis of rotation 11. The front end of the blade shaft 35 disposed outside the rotor 15 is formed as a blade mount to which a cutting blade 17 formed as a circular blade is releasably fastened.

The end of the blade shaft 35 projecting to the rear is formed as a toothed wheel 29 which forms a rotor-side part of a rotational drive for the blade shaft 35 and thus for the cutting blade 17.

A fixed-position sprocket which is supported by the fixed-position hub 23 or which is fastened to the housing wall 31 serves as a stationary part 27 of this rotational drive.

The ring-shaped sprocket 27 arranged concentrically with respect to the axis of rotation 11 is provided with an inner toothed arrangement which cooperates with the outer toothed arrangement of the toothed wheel 29 of the blade shaft 35.

With a rotating rotor shaft 13 and thus with a rotor 15 rotating about the axis of rotation 11, the blade shaft 35 and thus the cutting blade 17 revolve about the rotor shaft 13 in a planetary motion. In this respect the toothed wheel 29 of the blade shaft 35 rolls off at the inner toothed arrangement of the sprocket 27, whereby the blade shaft 35 and thus the cutting blade 17 are set into rotation relative to the rotor 15 about the blade axis 19.

In a slicing operation, the cutting blade 17 consequently carries out a revolving movement in a planetary motion about the axis of rotation 11 and additionally carries out a rotation about the blade axis 19 defined by the blade shaft 35.

The eccentric arrangement of the cutting blade 17 with respect to the axis of rotation 11 of the rotor shaft 13 results in an imbalance UM of the rotor 15. In accordance with the balancing concept explained in the introductory part, this imbalance UM is compensated by a counterweight which comprises two balance masses 47, 49. A first balance mass 47 is formed by the rotor 15. The first balance mass 47 generates an imbalance U1 which at least approximately opposes the imbalance UM in the radial direction. The second balance mass 49 is formed by the drive pulley 51 and acts at least approximately in the same radial direction as the imbalance UM (cf. also FIG. 5).

Figure 5:
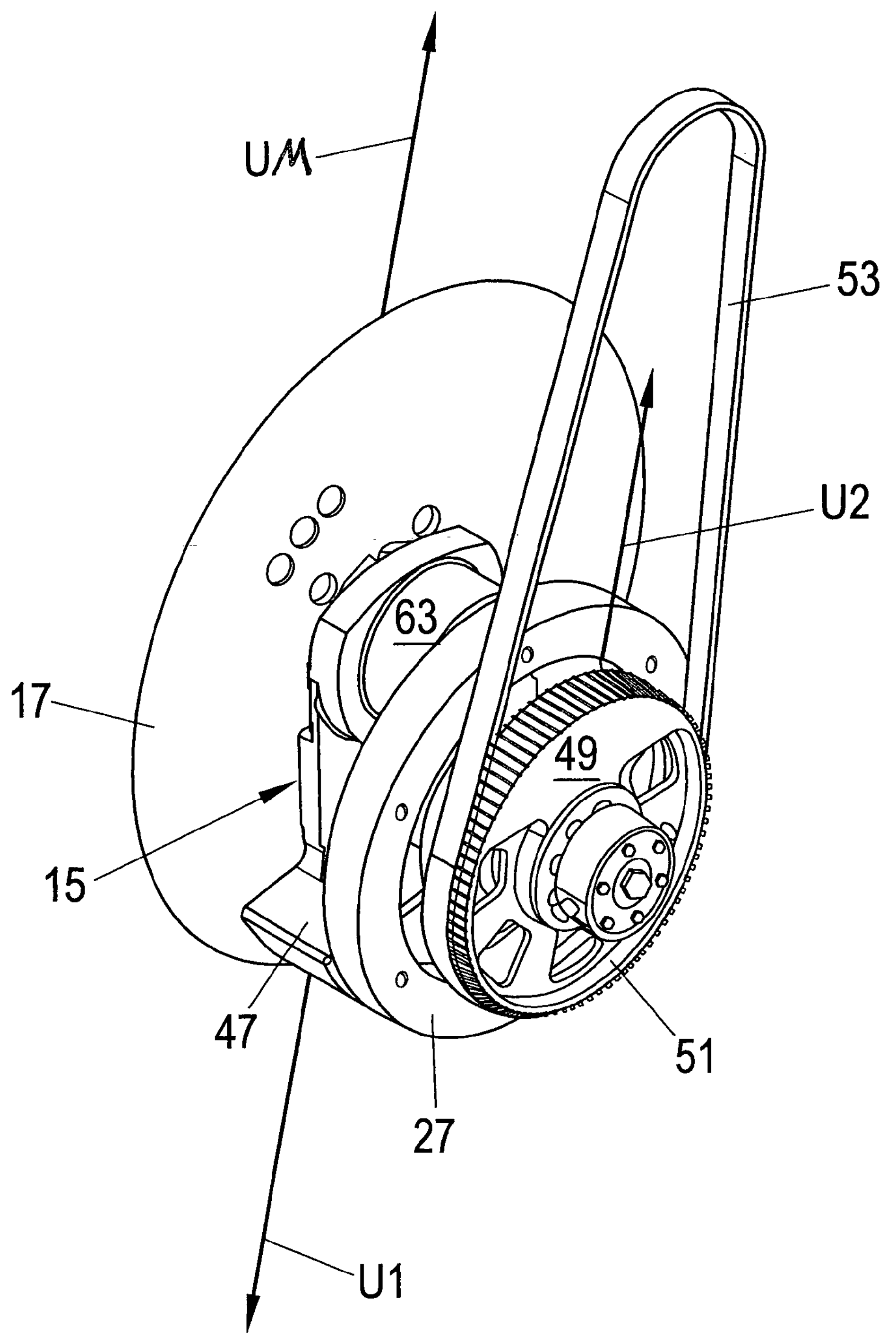

The lengths and directions of the vectors UM, U1 and U2 in FIGS. 1 and 5 are only to be understood as illustrations and should not represent any concrete, absolute or relative values.

The rotating total system is statically and dynamically balanced in all planes by this geometric arrangement of the balance masses.

The slicing apparatus in accordance with the invention consequently has a design which is simple, compact and extremely advantageous under hygienic aspects. The housing wall 31 separates the drive region from the cutting region. The hub 23 which, together with the combined axial and rotary bearing 21, supports the rotor shaft 13 extending through the housing wall 31 together with the rotor 15 and the cutting blade 17 in a rotatable and axially movable manner is located in front of the housing wall 31 and is thus outwardly open. This allows a hygienically flawless cleaning of the cutting region. A seal 55 seals the axial and rotary bearing 21 with respect to the environment.

The axial "nesting" of the components disposed outside the housing wall 31 provides an extremely compact design with a small axial construction length: The rear region of the hub 23 disposed at the housing wall 31 is within the sprocket 27 into which the blade shaft 35 with the toothed wheel 29 axially engages. The hub 23 itself and the rotor 15 likewise axially engage into one another. The rotary bearing 25 for the cutting blade 17 is axially at the level of the front region of the hub 23 and at the level of the axial and rotary bearing 21.

The rotor shaft 13 together with the rotor 15 and the cutting blade 17 as well as the blade shaft 35 and the toothed wheel 29 are adjusted in the axial direction, for example, for the carrying out of blank cuts and/or for the setting of a cutting gap. The rotational drive for the cutting blade 17 formed by the fixed-position sprocket 27 and by the toothed wheel 29 of the blade shaft 35 allows such an axial adjustment movement, while maintaining the rotational drive by the cooperation of the sprocket 27 and the toothed wheel 29.

This design of the rotational drive furthermore permits the rotor 15 together with the cutting blade 17 and the blade shaft 35 to be able to be simply removed, i.e. drawn off in the axial direction, by releasing the screw connection between the rotor 15 and the front end of the rotor shaft 13.

The remaining basic design of the hub 23, the stationary sprocket 27 and the rotor shaft 13 together with the rotary drive 33 with the balance mass 49 can hereby additionally serve as a drive for a blade mount (not shown) supporting a scythe-like blade. As explained in the introductory part, a universal slicer is provided by this basic design which is capable of both a scythe-like blade operation with only a scythe-like blade rotating about the axis of rotation 11 and, corresponding to the representation in FIG. 1, of a circular blade operation with a circular blade revolving about the axis of rotation 11 in a planetary motion and additionally carrying out a rotation about the blade axis 19.

The imbalance U1 of the balance mass 47 in the rotor 15 and the imbalance UM of the rotor 15 caused by the cutting blade 17 are coordinated with one another and with the imbalance U2 of the balance mass 49 integrated into the rotary drive 33. Like the rotor 15, the blade mount (not shown) supporting the scythe-like blade is likewise provided with a balance mass in scythe-like blade operation, said balance mass being coordinated with the respective imbalance of the scythe-like blade such that, in cooperation with the imbalance U2 of the balance mass 49 integrated into the rotary drive 33, a rotating total system balanced, both statically and dynamically, in all planes is in turn present.

The imbalance U1 of the rotor 15 is disposed substantially closer to the cutting plane 61 defined by the cutting blade 17 than the imbalance U2 of the rotary drive 33. The imbalance U1 of the rotor 15 is additionally disposed relatively far to the outside radially. This geometric arrangement of the balance masses 47, 49 thus makes it possible to use relatively small balance masses.

Figure 2:
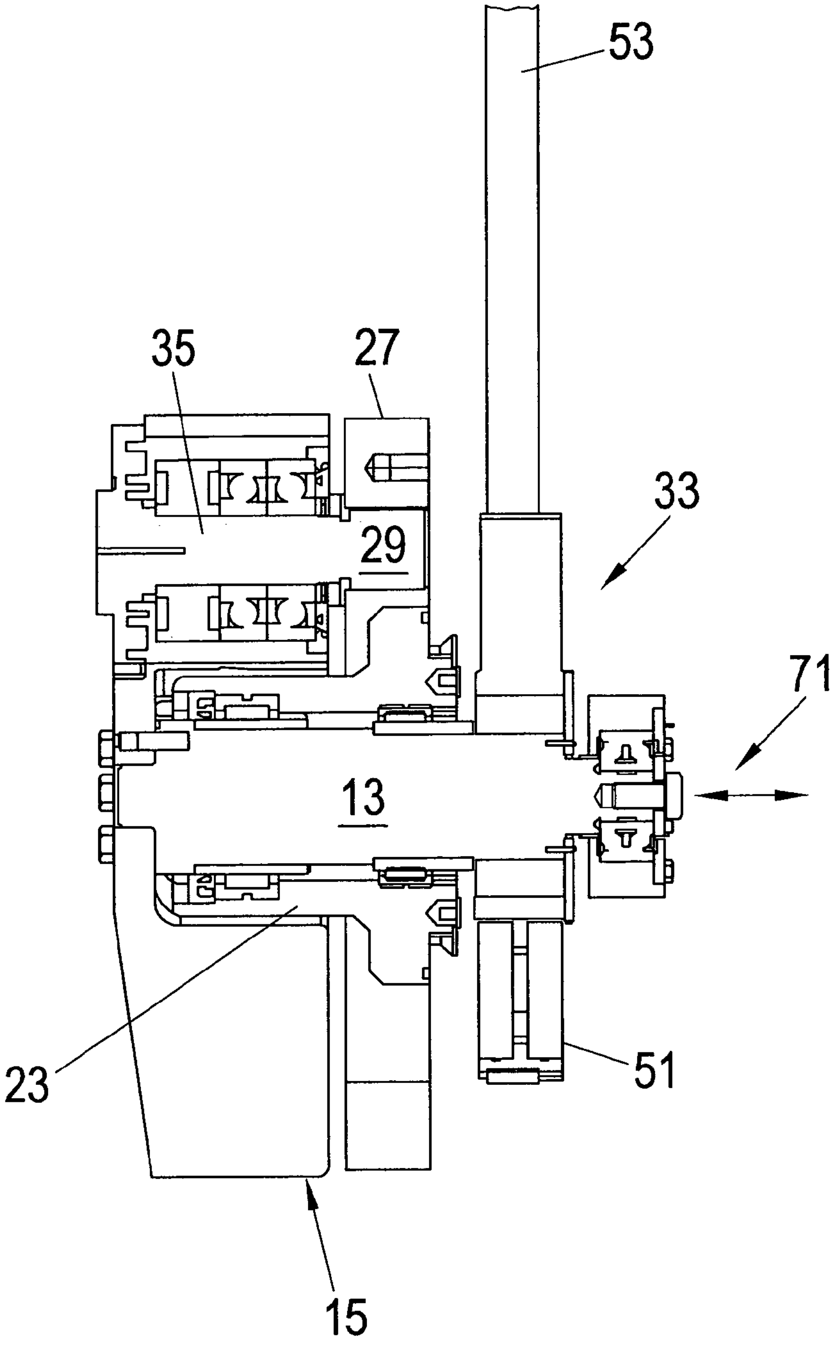

FIG. 2 shows the slicing apparatus in accordance with the invention without the housing wall 31 and without the cutting blade 17. The particular compactness of the components grouped both radially and axially around the fixed-position hub 23 can again be recognized.

Figure 3:
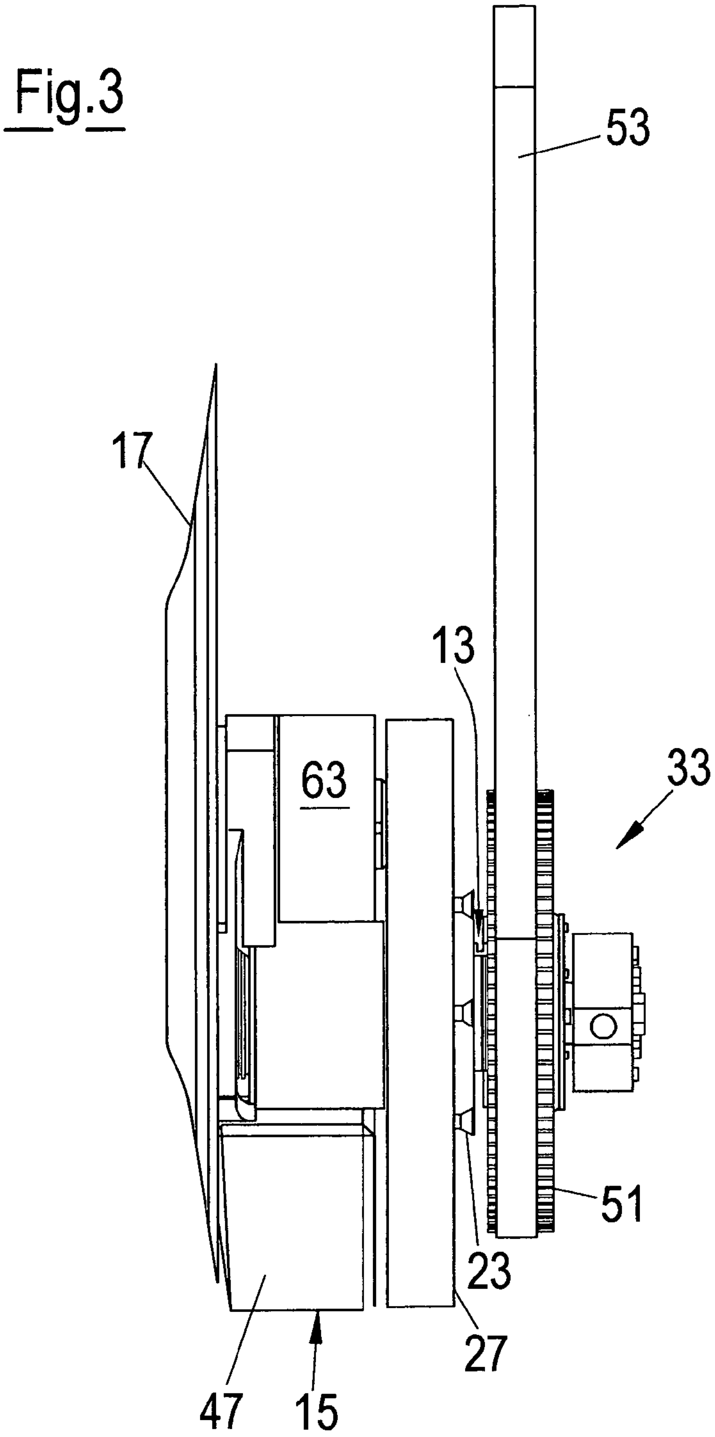

The side view of FIG. 3, in which the housing wall 31 is in turn not shown, in particular shows the open design of the components disposed in the cutting region, said design being advantageous under hygienic aspects. The rotary bearing for the blade shaft 35 projecting to the rear into the sprocket 27 is provided with a housing 63.

Figure 4:
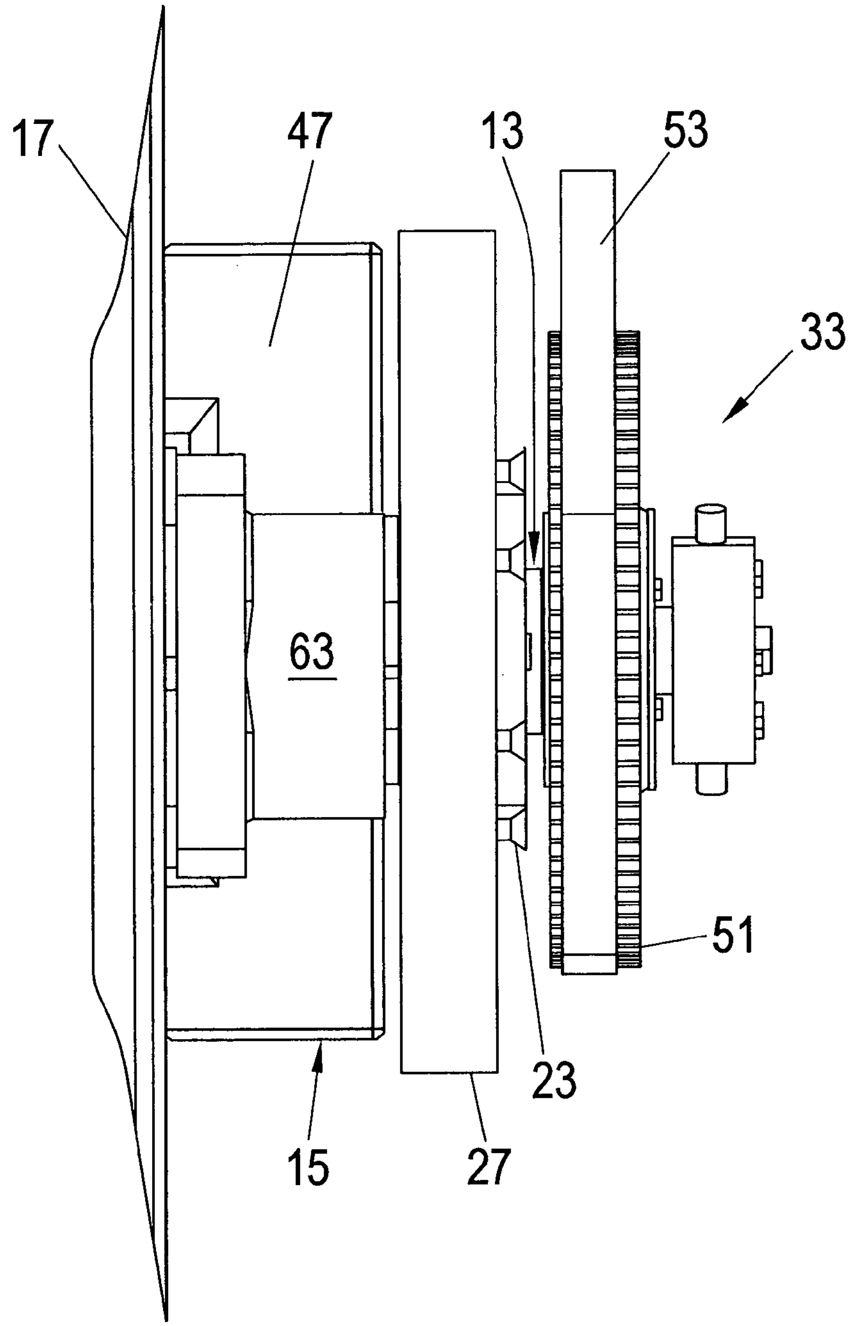
Figure 7:
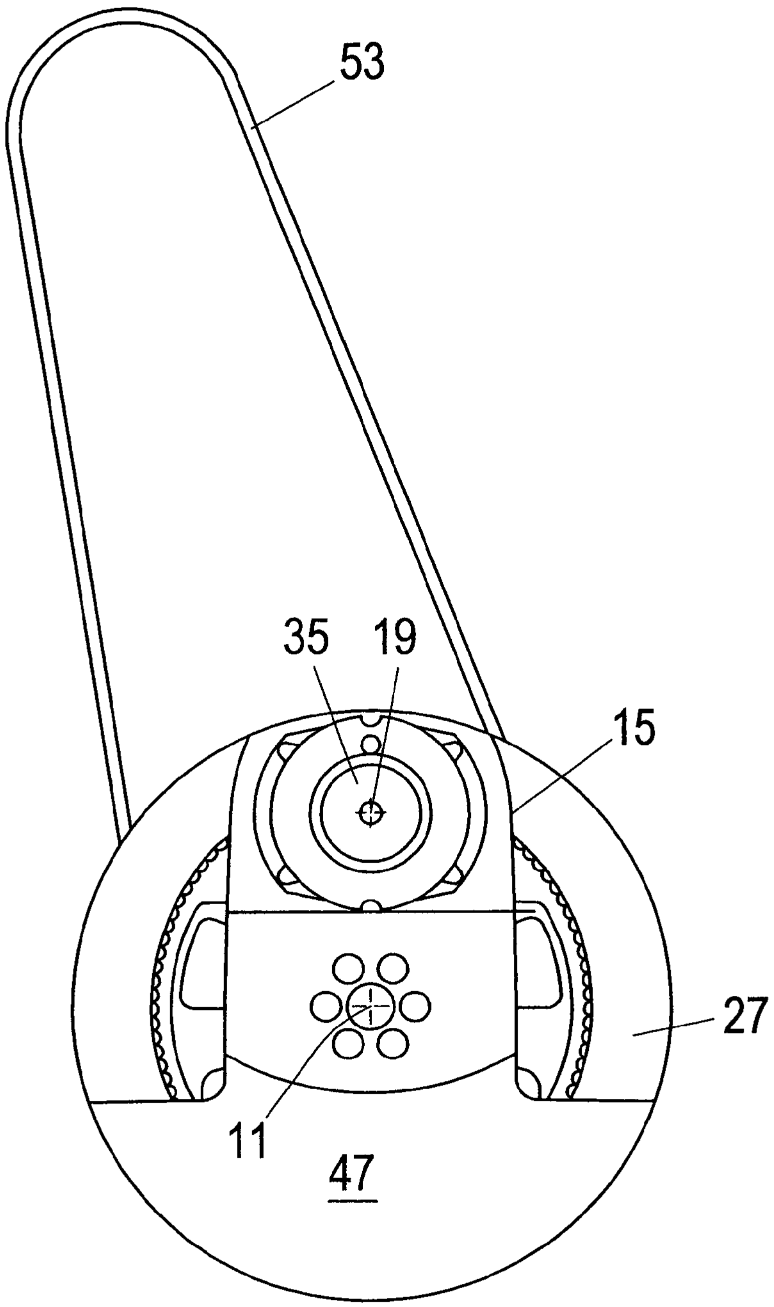

The design of the rotor 15 which deviates to an extreme extent from a rotationally symmetrical shape or from a circular outer contour can in particular be seen from the plan view of FIG. 4 (cf. also FIGS. 5 and 7). The first balance mass 47, which has comparatively large dimensions, is diametrically opposite the rotary bearing for the cutting blade 17 of which the housing 63 is in turn shown here and which has relatively small dimensions.

FIG. 5 in particular shows the very top-heavy design of the rotor 17 having a relatively heavy section which is formed by the first balance mass 47 and which is connected via a comparatively light central section to a diametrically opposite section to which the rotary bearing for the blade shaft of the cutting blade 17 is attached, with the housing 63 of the rotary bearing in turn being shown.

Figure 6:
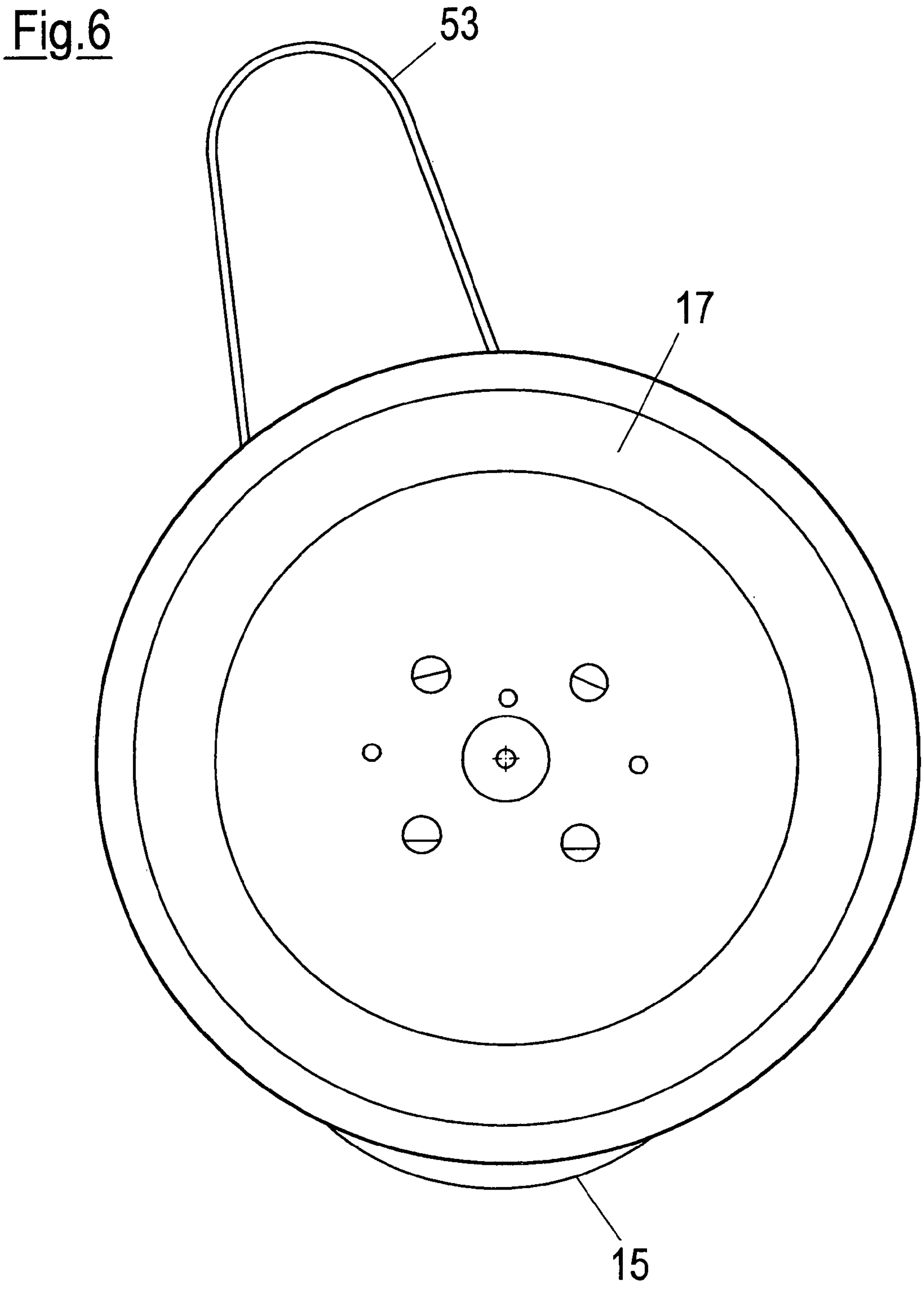

FIGS. 6 and 7 show front views with (FIG. 6) and without (FIG. 7) the cutting blade 17. The anchor-like shape of the rotor 15 can in particular be seen in FIG. 7. The inner toothed arrangement of the stationary sprocket 27 is additionally shown.

FIGS. 8 and 9 each show a further embodiment of a slicing apparatus in accordance with the invention in which a fixed-position axle 39 (FIG. 8) or a rotationally driven drive shaft 40 (FIG. 9) is provided for the rotational drive of the circular blade 17.

In both embodiments, the rotor shaft 13 for the rotor 15 is formed as a hollow shaft which supports a drive pulley 51 at a rear region which is able to be set into rotation about the axis of rotation 11 via a drive belt 53 by means of a motor not shown.

The axle 39 or the shaft 40 extends through the hollow shaft 13 and into the rotor 15.

In the embodiment of FIG. 8, the axle 39 supports a toothed belt wheel 41 which is likewise fixed with respect to rotation and at which a toothed belt 43 rolls off with a rotating rotor 15, said toothed belt 43 cooperating with a toothed arrangement 45 formed at the blade shaft 35 supporting the circular blade 17. The revolving movement in a planetary motion of the blade shaft 35 due to the rotational movement of the rotor 15 relative to the fixed-position toothed belt wheel 41 is consequently used to set the blade shaft 35 and thus the circular blade 17 into rotation relative to the rotor 15 about the blade axis 19.

The rotor 15 is formed in two parts for receiving the toothed belt wheel 41. This also applies to the embodiment of FIG. 9. In the embodiment of FIG. 8, the hub 23 is located together with the combined axial and rotary bearing 21 for the rotor shaft 13 formed as a hollow shaft within a housing, i.e. it is not outwardly open. The hub 23 is fastened to a wall 31 of the housing.

At its rear end, the rotor shaft 13 is provided with a pivot section 65 for an axial drive 71 which is again only indicated and which serves to axially adjust the rotor shaft 13 together with the rotor 15 and the circular blade 17. This is again indicated by double arrows.

The fixed-position axle 39 is not axially adjustable as a whole, but is rather telescopic so that the front section of the axle 39 supporting the toothed belt wheel 41 can be axially adjusted together with the rotor shaft 13 in order in particular to carry out blank cuts or to perform a cutting gap setting.

In the embodiment of FIG. 9, the hub 23 is formed by a fixed-position housing wall 31, with the hub 23 alternatively being able to be formed as a separate component which is fastened to the housing wall 31.

The drive shaft 40 extending through the rotor shaft 13 formed as a hollow shaft is provided with a toothed belt wheel 67 at its rear end and can be set into rotation via a toothed belt 69 by a separate drive motor, not shown, independently of the rotary drive 33 for the rotor shaft 13.

The transfer of the rotational movement of the drive shaft 40 to the blade shaft 35 takes place within the rotor 15 via a toothed belt 43 which cooperates with a toothed arrangement 45 of the blade shaft 35 and with a toothed belt wheel 41 of the drive shaft 40. Alternatively, a common drive motor having an intermediate transmission by which the belts 54 and 69 can be driven can be provided for the rotor shaft 13 and for the drive shaft 40.

A common axial adjustment of the rotor shaft 13 and of the drive shaft 40 takes place by an axial drive 71 which is in turn not shown in any more detail and which engages at a pivot section 65 of the rotor shaft 13.

The balancing concept explained above in the introductory part and in conjunction with the embodiment of FIGS. 1 to 7 is also realized in the embodiments in accordance with FIGS. 8 and 9: The rotor 15 is respectively provided with a first balance mass 47, whereas a second balance mass 49 is respectively integrated into the drive pulley 51 of the rotary drive 33 for the rotor shaft 13 which is formed as a hollow shaft here.

It applies to all embodiments shown that the belt drives for the rotor shafts 15 or for the drive shaft 40 do not stand in the way of the axial adjustment movement since only relatively short axial displacement paths are necessary in this respect and the drive belts 53, 69 can consequently be deflected accordingly.

REFERENCE NUMERAL LIST

11 axis of rotation
13 rotor shaft
15 rotor
17 cutting blade
19 blade axis
21 axial and rotary bearing for the rotor shaft 13
23 hub
25 rotary bearing for the cutting blade 17
27 stationary part of the rotational drive, sprocket
29 rotor-side part of the rotational drive, toothed wheel of the blade shaft 35
31 fixed-position rack part or frame part, housing wall, housing
33 rotary drive
35 blade shaft
39 fixed-position axle
40 drive shaft
41 toothed belt wheel of the fixed-position axle 39 or of the drive shaft 40
43 toothed belt
45 toothed arrangement of the blade shaft 35
47 first balance mass
49 second balance mass
51 drive pulley/hub of the rotary drive 33
83 drive belt of the rotary drive 33
55 seal
61 cutting plane
93 housing
65 pivot section for the axial drive 71
67 toothed belt wheel
69 toothed belt
71 axial drive
UM imbalance of the rotor 15
U1 imbalance of the first balance mass 47
U2 imbalance of the second balance mass 49

The invention claimed is:

1. An apparatus for slicing food products, comprising a rotor shaft which rotates about an axis of rotation and which is axially adjustable in operation;

a rotor driven by the rotor shaft;

a cutting blade, which is supported by the rotor, which revolves about the axis of rotation in a planetary motion and which additionally rotates relative to the rotor about a blade axis extending offset in parallel with the axis of rotation;

a rotary drive for the rotor shaft;

a rotational drive for the cutting blade comprising a rotationally driven or fixed-position drive shaft arranged coaxially with respect to the rotor shaft and by which a blade shaft of the cutting blade can be driven, the drive shaft extending through the rotor shaft formed as a hollow shaft to be in a shaft-in-shaft arrangement, the drive shaft extending into the rotor and cooperating with the blade shaft within the rotor, both the rotor shaft and the drive shaft at least partly axially adjustable;

an axial drive engaging the rotor shaft and providing a common axial adjustment of the rotor shaft and the drive shaft; and a stationary feature comprising at least one of a housing, a housing wall, a frame part and a rack part, the shaft-in-shaft arrangement extending through an opening of the stationary feature, the shaft-in-shaft arrangement axially movable relative to the stationary feature, a combined axial and rotary bearing for the rotor shaft, the rotor shaft being rotatably and axially adjustable relative to said bearing, wherein said bearing comprises a fixed-position hub or is associated with a fixed-position hub, and wherein said hub is fixedly formed by the stationary feature or is fixedly supported by the stationary feature.

2. The apparatus of claim 1, wherein the rotor shaft is axially adjustable in operation for the carrying out of blank cuts or for the setting of a cutting gap.

3. The apparatus of claim 1, wherein the rotor has a rotary bearing for the cutting blade, with the rotary bearing being arranged in an axial direction at the level of a combined axial and rotary bearing for the rotor shaft.

4. The apparatus of claim 1, wherein the rotor shaft is led through the stationary feature at whose one side the rotary drive is arranged and at whose other side the rotor is arranged.

5. The apparatus of claim 4, wherein the rotor is spaced apart from the stationary feature in the axial direction.

6. The apparatus of claim 1, wherein a rotational drive for the cutting blade is derived from the rotational movement of the rotor.

7. The apparatus of claim 1, wherein a rotational drive for the cutting blade is decoupled from the rotor shaft.

8. The apparatus of claim 1, wherein a rotational drive for the cutting blade comprises a blade shaft which is integrated into the rotor.

9. The apparatus of claim 1, wherein at least two balance masses are provided for compensating an imbalance of the rotor caused by the cutting blade, with the at least two balance masses all being arranged at a side of the cutting blade disposed opposite a dismantling side of the cutting blade.

10. The apparatus of claim 9, wherein a first balance mass and a second balance mass are arranged at different sides of the stationary feature.

11. The apparatus of claim 9, wherein a first balance mass and the imbalance of the rotor act in opposite radial directions, whereas a second balance mass acts at least approximately in the same radial direction as the imbalance of the rotor.

12. The apparatus of claim 9, wherein a first balance mass is integrated into the rotor or is formed by the rotor.

13. The apparatus of claim 9, wherein a first balance mass is arranged in the axial direction at the level of a combined axial and rotary bearing for the rotor shaft or of a rotary bearing for the cutting blade integrated into the rotor.

14. The apparatus of claim 9, wherein a second balance mass is integrated into the rotary drive of the rotor shaft or is formed by the rotary drive.

* * * * *